Dec. 28, 1943.  O. BRUMMER  2,337,639
LIQUID SEAL FOR ROTARY SHAFTS
Filed Feb. 8, 1941
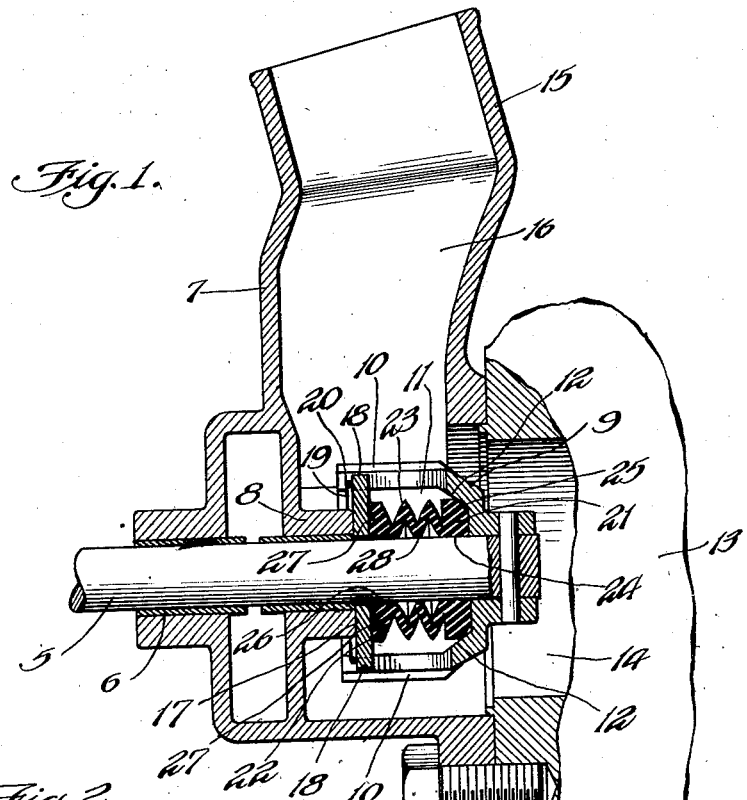
Fig. 1.
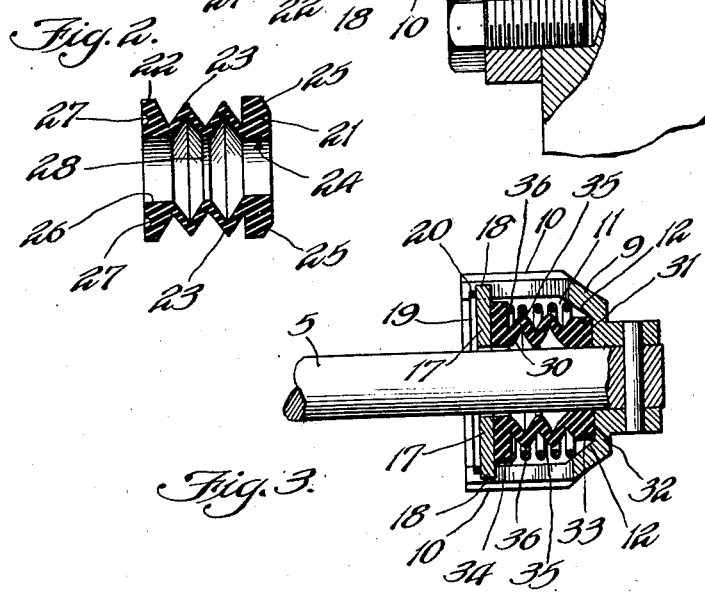
Fig. 2.
Fig. 3.
INVENTOR:
Olin Brummer
BY Kent W. Wonnell
ATTY.

Patented Dec. 28, 1943

2,337,639

UNITED STATES PATENT OFFICE 2,337,639

LIQUID SEAL FOR ROTARY SHAFTS

Olin Brummer, Oak Park, Ill., assignor to Crane Packing Company, Chicago, Ill., a corporation of Illinois Application February 8, 1941, Serial No. 378,021

1 Claim. (Cl. 288—2)

This invention relates in general to a packing or seal for a rotary shaft and is more particularly described as a seal for a fluid pump such as the water pump of an internal combustion engine adapted to eliminate or reduce leakage from the fluid chamber between the drive shaft and its bearing.

An important object of the invention is in the provision of a flexible sealing member preferably formed of rubber or a rubber substitute such as "neoprene" which will continuously maintain a fluid tight seal with the surface of the shaft and will permit relative longitudinal movement or end play between the shaft and bearing without disturbing the contact of the sealing surfaces.

A further object of the invetnion is in the provision of a packing or seal driven with the shaft to avoid relative rotation between the shaft and the packing, but permitting ready removal of the sealing structure for repair and replacement.

A still further object of the invention is in the provision of a seal adapted to be contained within a recess or cup, cast or formed in the hub of a pump impeller to prevent water and sediment from entering the seal and affecting the pump bearing surrounding the pump shaft.

A still further object of the invention is in the provision of an extended or bellows-like re-resilient sealing member formed in extended or expanded position or condition, and tending when compressed to expand and to permit a yielding movement which will accommodate itself to a misalignment or eccentric movement of the shaft and bearing without disturbing the sealing action.

Another object of the invention is in the provision of a flexible resilient bellows-like sealing member which may be readily incorporated and included as a part of pump structures now in use without varying the form or construction of the other mechanical elements to which it is applied.

Other and further objects of the invention will appear in the specification and will be apparent from the accompanying drawing, in which Fig. 1 is a sectional view illustrating a shaft seal in accordance with this invention as applied to the impeller of a rotary pump;

Fig. 2 is a sectional view of a sealing member as shown in Fig. 1 in an expanded position; and Fig. 3 is a sectional view of the modified form of sealing member.

To provide a satisfactory seal for a shaft or a similar rotating part, the sealing member should resiliently grip the shaft, but should make a fluid tight connection therewith, the other end of the member should make a fluid tight connection with a frictional engaging washer or disk, and the intermediate portion should be flexible and resilient, not frictionally engaging the shaft to any substantial extent, and still it should have sufficient longitudinal expansion between the ends to permit a relative movement of the shaft in its bearing to permit the necessary end play of the shaft. These results are obtained in the present invention by providing a sealing member with extended bellows-like or accordion folds which are slightly compressed in the ordinary installation of the sealing member which will permit a give and take up of the sealing member by means of the folds between the sealing ends thereof.

Referring now more particularly to the drawing, a pump shaft 5 is mounted in bearing sleeves 6 in a pump casing 7 having a bearing projection 8, surrounding one of the sleeves internally of the casing.

Attached to the shaft is an impeller 9 having peripheral pump blades or vanes 10, forming a hollow recess 11, opening toward the bearing away from the end of the shaft, and having an inclined surface 12 at the bottom of the recess.

The casing 7 is attached to a support 13 having a fluid inlet 14 arranged concentric with the end of the shaft and the impeller, and extending upwardly from the vanes is a hollow projection 15 forming a discharge 16 for the pump.

The pump vanes 10 preferably overlap the shaft bearing, and the recess 11 is provided for housing the seal which may be installed therein and inserted and removed with the shaft and impeller as a part thereof.

Seated at the outer end of the recess is a frictional disk 17 having outer projections 18 adapted to engage in slots between the vanes 10, to fit loosely or freely on the shaft and to rotate with the impeller 9. To prevent disengagement of the disk from the impeller, a spring ring 19 is seated in a groove 20 at the inner edge of the recess 11. The sealing member as shown in Fig. 2 is made of flexible resilient material such as rubber, neoprene, or any other suitable elastic material which does not deteriorate or lose its sealing and elastic properties due to heat or the material with which it comes in contact. This member is formed in a hollow sleeve with thicker end portions 21 and 22 joined by intermediate angular bellows-like folds 23 which are normally in extended form so that when compressed endwise, they tend to spring outwardly and to assume the expanded or extended form as shown. In compressing the unit, the adjacent inner faces of the angular folds are gradually and progressively engaged from the inside and outwardly, thereby bulging or rounding out the opposite sides of the folds as shown in Figs. 2 and 3, thus more resiliently and increasingly opposing the longitudinal compression of the unit. One end portion 21 has an inside opening 24 adapted to fit tightly upon any shaft or member to which it is applied and to make a fluid tight joint therewith. The outer edge 25 is beveled or inclined to engage the inclined surface 12 at the bottom of the impeller recess 11 and thereby tending to compress this end of the sealing member on a shaft to which the impeller is applied. The other end portion 22 has an inside opening 26 slightly larger in diameter than the shaft or other member to which it is applied and the outer or exposed face has a suction groove 27 tending to make this contact surface fit more tightly against the friction washer 17 to which it is applied. The inner diameter of the inner bellows rib 28 is also preferably larger than that of the end opening 24 so that the sealing member will engage the shaft in its normal movement only at one end thereof.

When this liquid seal is installed in the recess 11, it is partially compressed so that it will bear resiliently at one end at the bottom of the recess and the contact face at the other end will be pressed yieldingly against the face of the washer 17, pressing it against the end of the bearing 6 and its housing 8. As the shaft 5 is moved relatively endwise in the bearing, the sealing member will yield slightly but will always remain under compression whether the shaft is at one end of its relative movement or the other, thus maintaining a liquid tight seal at the ends of the member under all circumstances. Since the friction sealing disk 17 is rotated with the impeller 9, there is little tendency to wear the sealing member except in the bellows-like folds which are not subjected to severe expansion or contraction. In the form of the invention as shown in Fig. 3, a sealing member 30 is provided at one end with a tight fitting contact portion 31 for gripping a shaft and head having an outer groove 32 for seating a spring ring 33 therein for holding it more tightly against the shaft. At the other end is a flange rim 34 projecting beyond the intermediate bellows folds 35, the outer face abutting the frictional washer 17 and held in such engagement by a coil spring 35, one end of which bears against the inner side of the rim, and the other end of which is seated and contacts with the bottom of the recess 11, thus the sealing member is positively spring pressed at both of its sealing portions, one engaging the shaft, and the other engaging the frictional sealing washer, by means of the springs 33 and 35, the construction and action of the intermediate bellows portion being the same or similar to that in the form shown in Fig. 2.

In making or forming the sealing members, it is contemplated that they may be cast or molded of suitable material with the extended bellows-like folds therein, or they may be cut or formed from a block or from a continuous hollow cylinder by making opposite cuts of the proper size and dimensions inside and outside thereof. In either form, the bellows or accordion-like folds are extended so that the sealing member is slightly compressed in applying it to the impeller recess which insures a flexible sealing action at both ends of the member under all conditions within the limits of its intended movement.

I claim:

A fluid sealing unit for a relatively movable shaft and bearing, comprising a rubber-like sleeve with angular normally extended bellows folds integrally connected at their extremities with thicker end pieces, one end piece having a flat outer surface to engage a bearing, and the other end piece having an inner diameter to fit tightly upon a shaft, the compression of the unit engaging the adjacent inner sides of the angular folds to oppose longitudinal compression of the unit and the last named end piece having an inclined outer edge to compress this end piece upon the shaft when the said surface is engaged.

OLIN BRUMMER.